(12) United States Patent
Beaven et al.

(10) Patent No.: US 7,149,979 B2
(45) Date of Patent: Dec. 12, 2006

(54) DATA MANAGEMENT SYSTEM AND METHOD FOR PERIPHERAL DEVICES

(75) Inventors: Joseph Damon Beaven, Lexington, KY (US); Joshua Everett Ellingsworth, Lexington, KY (US); William Roger Steen, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 834 days.

(21) Appl. No.: 09/802,577

(22) Filed: Mar. 8, 2001

(65) Prior Publication Data

US 2002/0126145 A1 Sep. 12, 2002

(51) Int. Cl.
*G06F 3/00* (2006.01)

(52) U.S. Cl. .................. 715/762; 715/764; 358/1.1
(58) Field of Classification Search ............ 715/762; 717/168, 169; 345/762, 740, 764, 765
See application file for complete search history.

(56) References Cited

U.S. PATENT DOCUMENTS

| | | | |
|---|---|---|---|
| 4,598,384 A | 7/1986 | Shaw et al. | |
| 4,839,829 A | 6/1989 | Freedman | |
| 5,040,132 A | 8/1991 | Schuricht et al. | |
| 5,132,711 A | 7/1992 | Shinada et al. | |
| 5,450,571 A | 9/1995 | Rosekrans et al. | |
| 5,574,484 A | 11/1996 | Cowger | |
| 5,579,446 A | 11/1996 | Naik et al. | |
| 5,580,177 A | 12/1996 | Gase et al. | |
| 5,600,762 A | 2/1997 | Salgado et al. | |
| 5,625,757 A | 4/1997 | Kageyama et al. | |
| 5,630,101 A * | 5/1997 | Sieffert ..................... | 710/11 |
| 5,631,674 A | 5/1997 | Shinada et al. | |
| 5,636,332 A | 6/1997 | Hibino | |
| 5,640,495 A | 6/1997 | Colbert et al. | |
| 5,682,140 A | 10/1997 | Christensen et al. | |
| 5,691,750 A | 11/1997 | Edwards | |
| 5,694,528 A | 12/1997 | Hube | |
| 5,699,494 A | 12/1997 | Colbert et al. | |
| 5,699,495 A | 12/1997 | Snipp | |
| 5,704,021 A | 12/1997 | Smith et al. | |
| 5,706,410 A | 1/1998 | Bagley et al. | |
| 5,774,720 A * | 6/1998 | Borgendale et al. ........ | 709/329 |
| 5,805,777 A * | 9/1998 | Kuchata ..................... | 345/1.13 |
| 5,838,325 A | 11/1998 | Deen et al. | |
| 5,905,510 A | 5/1999 | Hagiwara et al. | |
| 5,933,144 A | 8/1999 | Alcorn | |
| 5,950,001 A * | 9/1999 | Hamilton et al. ........... | 717/107 |
| 5,966,144 A | 10/1999 | Edwards | |
| 6,260,160 B1 * | 7/2001 | Beyda et al. .................. | 714/27 |
| 6,549,947 B1 * | 4/2003 | Suzuki ....................... | 709/229 |

* cited by examiner

*Primary Examiner*—Kieu D. Vu
(74) *Attorney, Agent, or Firm*—Thompson Hine LLP

(57) ABSTRACT

An operating system for managing data in a computer including a printer properties dialog module, a printer data module and a conflict dialog module. The printer properties dialog module contains GUI code to generate a graphic-user interface (GUI) for a printer. The printer data module is coupled to and receives data from the printer properties dialog module. The printer data module contains operating code for the printer and causes it to execute predetermined actions corresponding to GUI commands received from the printer properties dialog module. The conflict dialog module is coupled to the printer data module and contains a list of conflicts. Each conflict corresponds to a printer condition and a printer action. The GUI code of the printer properties dialog module, the operating code of the printer data module and the list of conflicts of the conflict dialog module are independently modifiable.

36 Claims, 2 Drawing Sheets ns. More particularly, the present invention relates to an operating system of managing data related to a graphic-user interface (GUI) and a peripheral device such as a printer associated with a computer.

DATA MANAGEMENT SYSTEM AND METHOD FOR PERIPHERAL DEVICES

BACKGROUND OF THE INVENTION

1. Field of the Invention

The present invention generally relates to computer systems. More particularly, the present invention relates to an operating system of managing data related to a graphic-user interface (GUI) and a peripheral device such as a printer associated with a computer.

2. Description of the Related Art

Most operating systems of computers generate a graphic-user interface (GUI) to a user that provides textual and graphical information with which a user of a computer can interact to perform various functions with the computer. Operating systems such as Windows® and the Apple Mac® O/S have a GUI that displays various virtual interactive controls, such as button, tabs, and bars that typically are interactive with the cursor of the mouse at the GUI. GUI enables a user to create, modify, and respond to graphical objects in real time. A user provides a command to the computer through the GUI by utilizing a pointing or locator device, such as a mouse, trackball, joystick, or stylus with tablet. These devices convert the physical movement of the user's hand into the movement of a cursor or an object on the computer display screen, which in turn can be converted into a computer command or a stream of data in digital form that can be utilized to perform various functions or predetermined actions with the computer.

To implement the GUI, the host operating system contains a GUI code directing the execution of the GUI. The host operating system also contains a data management code for supervising the location, storage, and retrieval of data (including input and output to various peripherals). The data management code manages, for example, the GUI data. Additionally, if the peripheral is a printer, the host operating system may contain a printer operating code or printer driver to operate the printer.

Currently, the printer operating code and the GUI code are intertwined in operating systems such as Windows® and the Apple Mac® O/S. Thus, if a modification is made to the GUI code to incorporate a new functionality, the printer operating code has to be rewritten or modified in response to the modification made to the GUI code. Likewise, if a modification is made to the printer operating code to incorporate a new functionality, the GUI code has to be rewritten or modified in response to the modification made to the printer operating code. This interdependency of the printer operating code and the GUI code not only limits the applicability and flexibility of the operating system, but also increases cost and labor for modifying the codes. Additionally, bugs in the printer operating code may affect the performance of the GUI code, and vice versa.

Therefore, there exists a need for a system of managing independently data related to a graphic-user interface (GUI) and data related to a peripheral device such as a printer associated with a computer.

SUMMARY OF THE INVENTION

In one aspect, the present invention is an operating system for managing data in a computer. The operating system has a main dialog module containing a graphic-user interface (GUI) code for generating a GUI for interfacing between a host processor of the computer and a user. The operating system also has a data module coupled to the main dialog module, the data module containing an operating code for causing the host processor to execute a predetermined action responsive to a computer command initiated at the GUI. The operating system further has a conflict dialog module coupled to the data module and having a list of conflicts, the data module causing the conflict dialog module to generate a conflict from the list of conflicts responsive to a selected predetermined action to be executed by the host processor. In the embodiment of the present invention, the GUI code, the operating code and the list of conflicts of the conflict dialog module are independently modifiable. For example, the list of conflicts of the conflict dialog module is unaffected by a modification to the GUI code when the GUI code is modified with the modification, and vice versa. The GUI code is unaffected by a modification to the operating code, and vice versa. And the list of conflicts of the conflict dialog module is unaffected by a modification to the operating code, and vice versa. In one embodiment, the operating system of the present invention can be utilized to manage data for a peripheral device coupled to the computer.

In another aspect of the present invention, the system has a printer properties main dialog module, a printer data module and a conflict dialog module. The printer properties main dialog module contains a graphic-user interface (GUI) code for generating a GUI for displaying data for a printer in operative communication with a host processor. The printer data module is coupled to the printer properties main dialog module. The printer data module contains an operating code for operating the printer and can cause the printer to execute a predetermined action corresponding to a computer command initiated at the GUI. The conflict dialog module is coupled to the printer data module and has a list of conflicts. Each conflict is corresponding to a condition of the printer and a selected predetermined action to be executed by the printer. The printer data module causes the conflict dialog module to generate a conflict from the list of conflicts corresponding to a condition in printer setting and a selected predetermined action to be executed by the printer to alert a user of the printer. The GUI code of the printer properties main dialog module, the operating code of the printer data module and the list of conflicts of the conflict dialog module are independently modifiable.

In a further aspect, the present invention relates to a method for managing data for a printer coupled to a computer having a host processor. The method includes the steps of generating a graphic-user interface (GUI) for displaying data for a printer in operative communication with the host processor from a GUI code, causing the printer to execute a predetermined action corresponding to a computer command initiated at the GUI from an operating code, and generating a conflict corresponding to a condition of the printer and a selected predetermined action to be executed by the printer from a list of conflicts. The method further includes the steps of modifying the list of conflicts with a modification and keeping the GUI code unaffected while the list of conflicts is modified with the modification.

The present invention further includes a computer program product in a computer readable medium of instructions. The computer program product has instructions within the computer readable medium for generating graphic-user interface (GUI) displaying data for a peripheral device in operative communication with a host processor of a computer. Additionally, the computer program product has instructions within the computer readable medium for operating the peripheral device and causing the peripheral device to execute a predetermined action corresponding to a computer command initiated at the GUI. Furthermore, the computer program product has instructions within the computer readable medium for producing a list of conflicts, each conflict corresponding to a condition of the peripheral device and a selected predetermined action to be executed by the peripheral device. The instructions within the computer readable medium for generating GUI and the instructions within the computer readable medium for producing a list of conflicts are independently modifiable. In other words, when the instructions within the computer readable medium for generating GUI are modified with a modification, the instructions within the computer readable medium for producing a list of conflicts are unaffected by the modification, and vice versa. Moreover, the instructions within the computer readable medium for operating the peripheral device and the instructions within the computer readable medium for generating GUI are independently modifiable.

The peripheral device can be a printer, a copy machine, a fax machine, a scanner, a keyboard or any combination of them. In one embodiment of the present invention, the peripheral device is a printer, and the computer program product is an operating system for managing data in a Windows® environment of a computer with a printer coupled to the computer. The operating system can be installed in the printer controller of the printer, or in the host processor of the computer. Alternatively, the operating system can be installed partially in the printer controller and partially in the host processor of the computer.

These and other aspects will become apparent from the following description of the preferred embodiment taken in conjunction with the following drawings, although variations and modifications may be effected without departing from the spirit and scope of the novel concepts of the disclosure.

DETAILED DESCRIPTION OF THE INVENTION

Figure 1:
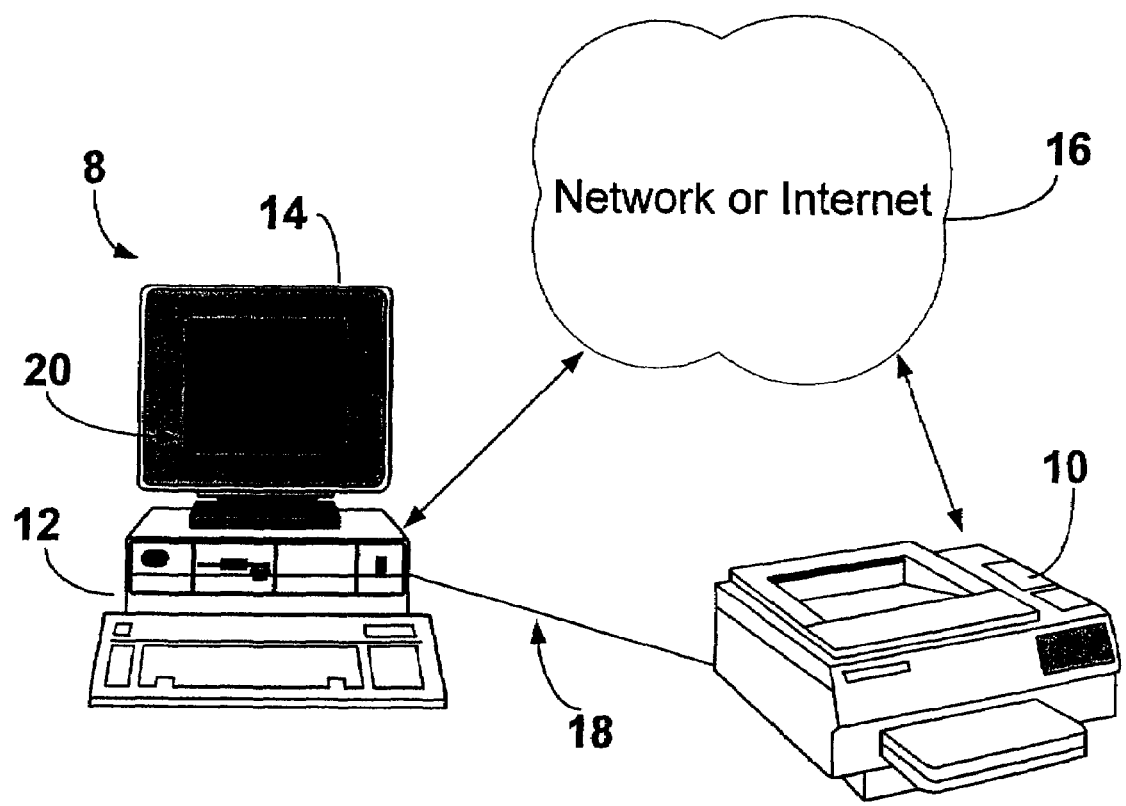
FIG. 1 is a perspective view of a host computer in communication with a peripheral device, shown here as a printer.

A preferred embodiment of the invention is now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

With reference to FIG. 1, there is shown a perspective view of the inventive system including a host computer 8 having a host processor 12 with a display 14, such as a monitor, having a graphic-user interface (GUI) 20 displaying data for at least one peripheral device 10, shown here as a printer, in operative communication with the host processor 12. The printer 10 and host processor 12 can be in communication through any media, such as a direct wire connection 18 or through a network or the Internet 16. Even wireless communication between the printer 10 and host processor 12 can be used with the present invention as long as data can be exchanged between the printer 10 and host processor 12. The GUI 20 is generated by a GUI code as part of the operating system (O/S) of the host processor 12. The printer 10 can be operated through a printer driver or operating code installed in the host processor 12 or installed in the printer 10, in which case the printer driver communicates with the operating system of the host processor 12.

In operation, upon receiving an input from the GUI 20, the host processor 12 translates the input into a computer command to cause the printer 10 to execute a predetermined action responsive to the computer command. The translation may be done in one of several ways. For example, the host processor 12 could employ a lookup table resident in memory to generate a computer command. Similarly, the computer commands could be hard wired in the host processor 12 or they could be resident in firmware. The computer commands are data or instructions in digital form that are readable to the host processor 12 and the printer controller of the printer 10. Unless the context clearly dictates otherwise, as used in the description herein and throughout the claims that follow, the meaning of "data" includes any information in digital form that is originated at, saved in, related to, or exchanged between the computer 8 and the printer 10.

Figure 2:
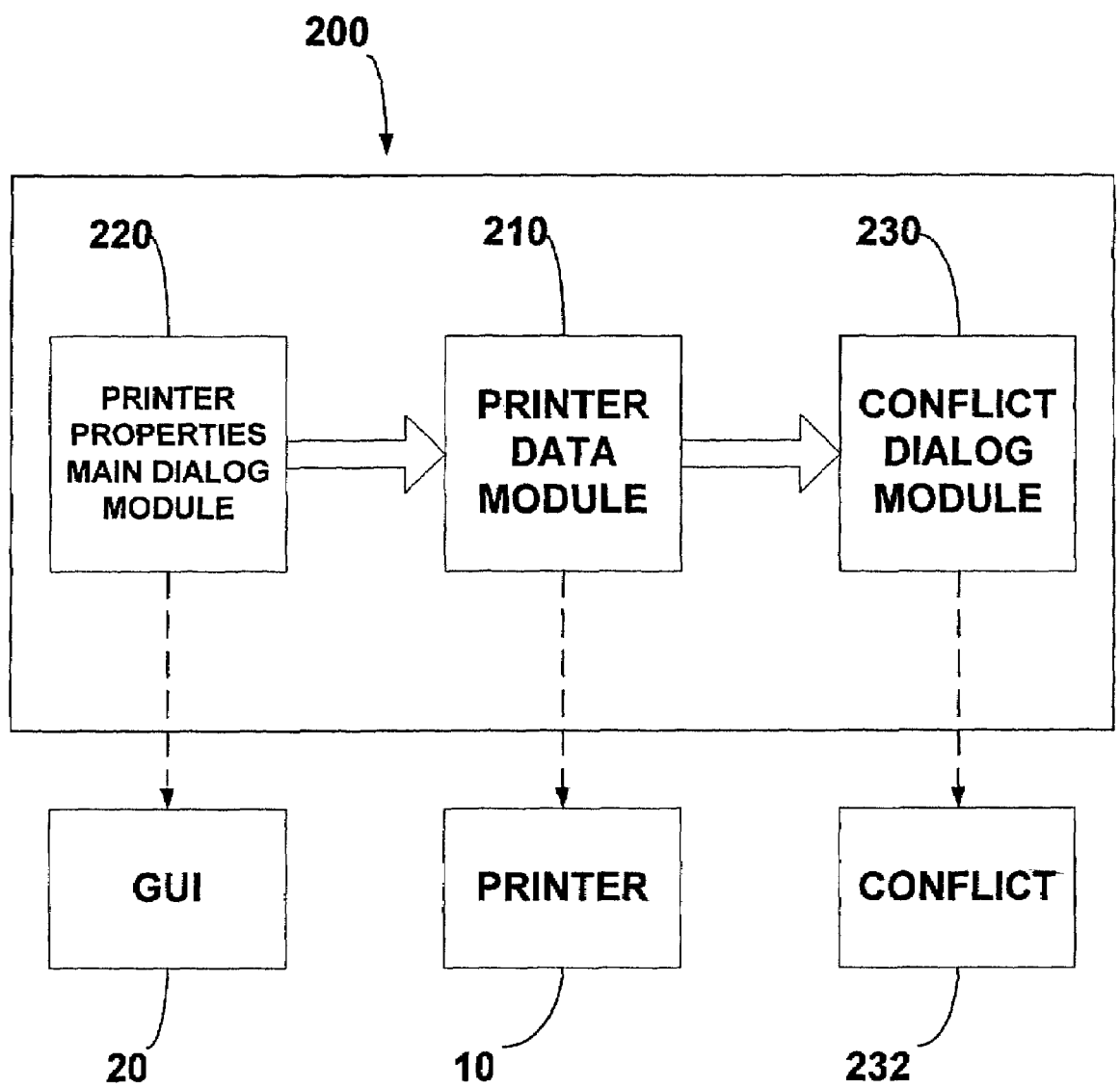
FIG. 2 is a schematic block diagram of an operating system of the present invention that can be utilized in the system shown in FIG. 1.

As shown in FIG. 2, an operating system 200 can be utilized to manage data for the computer 8 and the printer 10. The system 200 includes a printer properties main dialog module 220, a printer data module 210 and a conflict dialog module 230. The printer properties main dialog module 220 contains a GUI code to generate the GUI 20 for displaying data for the printer 10 that is in operative communication with the host processor 12. The printer data module 210 is coupled to the printer properties main dialog module 220 and receives data from the printer properties main dialog module 220. The printer data module 210 contains an operating code for operating the printer 10 and can cause the printer 10 to execute a predetermined action corresponding to a computer command initiated at the GUI 20 by a user and received from the printer properties main dialog module 220. The conflict dialog module 230 is coupled to and owned by the printer data module 210. The conflict dialog module 230 contains a list of conflicts. Each conflict is corresponding to a condition of the printer setting of the printer 10 and a selected predetermined action to be executed by the printer 10. A conflict arises when a user of the printer 10 chooses a condition from the printer setting and causes the printer driver to perform a predetermined action, the intended action and the selected condition may not be compatible to each other and produce an outcome that is not desired by the user. The printer data module 210 then causes the conflict dialog module 230 to generate a conflict 232 from the list of conflicts corresponding to the condition of the printer 10 and that selected predetermined action. The conflict 232 can be displayed in the GUI 20 to alert the user of the printer 10. For example, if a user chooses from the printer setting of the printer 10 a condition "transparency" as paper type and causes the printer driver to perform a "mirror" function, the intended "mirror" function or action and the selected condition "transparency" would produce an outcome of having a mirror image on a transparency, which may not be a desired outcome by the user. The printer data module 210 thus causes the conflict dialog module 230 to generate a conflict 232 from the list of conflicts corresponding to the condition "transparency" and the selected "mirror" function to be performed by the printer 10 to warn the user. The user has the option to correct the conflict either by selecting a new condition from the printer setting of the printer 10, causing the printer driver to perform a new function, or both. Thus, catching a conflict and giving a user ability to correct or modify it according to the present invention enhances usability of the system.

The GUI code of the printer properties main dialog module 220, the operating code of the printer data module 210 and the list of conflicts of the conflict dialog module 230 are not intertwined and thus independently modifiable. In other words, if the GUI code of the printer properties main dialog module 220 is modified with a modification, for example, to incorporate a new functionality, the operating code of the printer data module 210 and the list of conflicts of the conflict dialog module 230 are unaffected by the modification. Likewise, if the list of conflicts of the conflict dialog module 230 is modified with a modification, for example, to add or incorporate a new conflict or to edit an existing conflict, the operating code of the printer data module 210 and the GUI code of the printer properties main dialog module 220 are unaffected by the modification. Similarly, if the operating code of the printer data module 210 is modified with a modification, for example, to incorporate a new functionality, the list of conflicts of the conflict dialog module 230 and the GUI code of the printer properties main dialog module 220 are unaffected by the modification.

In particular, the list of conflicts of the conflict dialog module 230 can be modified to display any functional aspect that is unique to the printer 10 even if the operating system of the host processor 12 does not recognize or interact with the full functionality of the printer 10. Furthermore, the printer properties main dialog module 230 can translate the commands from the user at the GUI 20 into data that effects the desired changes in the peripheral device 10 independently of the host processor operating system command structure, if necessary. Moreover, the separation of the modules from intertwining to each other increases the portability of each module and thereby reduces the labor and cost for programming development.

The implementation of the printer properties main dialog module 220, the printer data module 210 and the conflict dialog module 230 can be programmed in C++, Microsoft Visual C++ v6.0, or any other computer language that would not conflict with the operating system of the host processor 12. The choice of C++ as the implementation language allows the developers to reuse the source code more readily than with most other languages. The operating system 200 can be operated in environment such as Windows® or the Apple Mac® O/S. Moreover, the operating system 200 can be installed in the printer 10, or in the host processor 12. Alternatively, the operating system 200 can be installed partially in the printer 10 and partially in the host processor 12. For example, the printer properties main dialog module 220 may be installed in the host processor 12, and the printer data module 210 and the conflict dialog module 230 may be installed in the printer 10.

As those skilled in the art will appreciate, while the present invention has been described in the context of a fully functional data management system, the mechanism of the present invention is capable of being distributed in the form of a computer readable medium of instructions in a variety of forms, and the present invention applies equally regardless of the particular type of signal bearing media used to actually carry out the distribution. Examples of computer readable media include: recordable type media such as floppy disks and CD-ROMs and transmission type media such as digital and analog communication links.

Additionally, while the present invention has been described in the context of a fully functional operating system for managing data related to a printer coupled to a computer, the mechanism of the present invention is capable of being utilized to other peripheral devices such as a copy machine, a scanner, a fax machine, a keyboard or any combination of them.

Indeed, the operating system of the present invention can be implemented to any Windows® applications in a Windows® environment by separating the operating code that implements the user interface from data including code related to "reactions" of the user interface to a user's input(s), where the operating system may not be related to any peripheral devices at all. In this embodiment, the operating system has a main dialog module, a data module and a conflict dialog module. The main dialog module contains a GUI code for generating a GUI for interfacing between a host processor of a computer and a user. The data module is coupled to the main dialog module and contains an operating code for causing the host processor to execute a predetermined action responsive to a computer command initiated at the GUI. The conflict dialog module is coupled to the data module and has a list of conflicts, where each conflict is corresponding to a selected predetermined action to be executed by the host processor.

While there has been shown preferred and alternate embodiments of the present invention, it is to be understood that certain changes can be made in the form and arrangement of the elements of the system and steps of the method as would be known to one skilled in the art without departing from the underlying scope of the invention as is particularly set forth in the claims. Furthermore, the embodiments described above are only intended to illustrate the principles of the present invention and are not intended to limit the Claims to the disclosed elements.

What is claimed is:

1. A data management system comprising:
   a. a computer including a host processor;
   b. at least one peripheral device in communication with the host processor;
   c. a main dialog module containing a graphic-user interface (GUI) code for generating a GUI for interfacing between the host processor and a user;
   d. a data module coupled to the main dialog module, the data module containing an operating code for causing the host processor to execute a predetermined action responsive to a computer command initiated at the GUI; and
   e. a conflict dialog module coupled to the data module and having a list of conflicts, the data module causing the conflict dialog module to generate a conflict from the list of conflicts responsive to a selected predetermined action to be executed by the host processor,
   wherein the list of conflicts of the conflict dialog module is unaffected by a modification to the GUI code when the GUI code is modified with the modification.

2. The system of claim 1, wherein when the list of conflicts of the conflict dialog module is modified with a modification, the GUI code is unaffected by the modification to the list of conflicts of the conflict dialog module.

3. The system of claim 1, wherein when the GUI code is modified with a modification, the operating code of the data module is unaffected by the modification to the GUI code.

4. The system of claim 1, wherein when the operating code of the data module is modified with a modification, the GUI code is unaffected by the modification to the operating code of the printer data module.

5. The system of claim 1, wherein the peripheral device is operated by the operating code of the data module.

6. The system of claim 5, wherein the at least one peripheral device is a printer, a copy machine, a scanner, a fax machine, a key board, or any combination of them.

7. The system of claim 1, wherein one of the main dialog module, the data module or the conflict dialog module are independently modifiable such that one of the modules can be modified without affecting either of the other modules.

8. A system for managing data comprising:
   a. a host processor;
   b. a printer in communication with the host processor;
   c. a printer properties main dialog module containing a graphic-user interface (GUI) code for generating a GUI for displaying data for the printer;
   d. a printer data module coupled to the printer properties main dialog module, the printer data module containing an operating code for operating the printer and causing the printer to execute a predetermined action corresponding to a computer command initiated at the GUI; and
   e. a conflict dialog module coupled to the printer data module and having a list of conflicts, each conflict corresponding to a condition of the printer and a selected predetermined action to be executed by the printer, the printer data module causing the conflict dialog module to generate a conflict from the list of conflicts,
   wherein the printer properties main dialog module, the printer data module and the conflict dialog module are independently modifiable, such that one of the modules may be modified without affecting at least one of the other modules.

9. The system of claim 8, wherein when the list of conflicts of the conflict dialog module is modified with a modification, the GUI code is unaffected by the modification to the list of conflicts of the conflict dialog module.

10. The system of claim 8, wherein when the GUI code is modified with a modification, the operating code of the printer data module is unaffected by the modification to the GUI code.

11. The system of claim 8, wherein when the operating code of the printer data module is modified with a modification, the GUI code is unaffected by the modification to the operating code of the printer data module.

12. The system of claim 8, wherein when the GUI code is modified with a modification, the list of conflicts of the conflict dialog module is unaffected by the modification to the GUI code.

13. The system of claim 8, wherein one of the modules can be modified without affecting either of the other modules.

14. A method for managing data in an operating system of a host processor, the processor having a printer in communication therewith, comprising the steps of:
   a. generating a graphic-user interface (GUI) for displaying data for the printer from a GUI code included in a printer properties main dialog module;
   b. causing the printer to execute a predetermined action corresponding to a computer command initiated at the GUI from an operating code included in a printer data module; and
   c. generating a conflict corresponding to a condition of the printer and a selected predetermined action to be executed by the printer from a list of conflicts included in a conflict dialog module,
   wherein the printer properties main dialog module, the printer data module and the conflict dialog module are each independently modifiable, such that a modification of one of the modules does not affect at least one of the other modules.

15. The method of claim 14, further comprising the steps of:
   a. modifying the list of conflicts with a modification; and
   b. keeping the GUI code unaffected while the list of conflicts is modified with the modification.

16. The method of claim 14, further comprising steps of modifying the GUI code with a modification and keeping the list of conflicts unaffected while the GUI code is modified with the modification.

17. The method of claim 14, further comprising steps of modifying the operating code with a modification and keeping the GUI code unaffected while the operating code is modified with the modification.

18. The method of claim 14, wherein one of the modules can be modified without affecting either of the other modules.

19. A system for managing data comprising:
   a. a processing means for generating a graphic-user interface (GUI) for displaying data for a printer in operative communication with a host processor from a GUI code;
   b. an operating means for causing the printer to execute a predetermined action corresponding to a computer command initiated at the GUI from an operating code; and
   c. a dialog means for generating a conflict from a list of conflicts, wherein each conflict is corresponding to a condition of the printer and a selected predetermined action to be executed by the printer,
   wherein the processing means, the operating means and the dialog means are each independently modifiable, such that the modification of a selected one of the means does not affect at least one of the other two means.

20. The system of claim 19, further comprising means for keeping the GUI code unaffected while the list of conflicts is modified with a modification.

21. The system of claim 19, wherein the GUI code is modifiable, and further comprising means for keeping the list of conflicts unaffected while the GUI code is modified with a modification.

22. The system of claim 19, wherein the operating code is modifiable, and further comprising means for keeping the GUI code unaffected while the operating code is modified with a modification.

23. The system of claim 19, wherein one of the processing means, the operating means or the dialog means can be modified without affecting either of the other two means.

24. A computer program product comprising:
   a. a recordable medium, said recordable medium being readable by a computer;
   b. instructions within the recordable medium for generating graphic-user interface (GUI) displaying data for a peripheral device in operative communication with a host processor of a computer;
   c. instructions within the recordable medium for operating the peripheral device and causing the peripheral device to execute a predetermined action corresponding to a computer command initiated at the GUI; and
   d. instructions within the recordable medium for producing a list of conflicts, each conflict corresponding to a condition of the peripheral device and a selected predetermined action to be executed by the peripheral device, wherein the instructions within the recordable medium for generating the GUI and the instructions within the recordable medium for producing a list of conflicts are independently modifiable, and when the instructions within the recordable medium for generating GUI are modified with a modification, the instructions within the recordable medium for producing a list of conflicts are unaffected by the modification.

25. The computer program product of claim 24, wherein when the instructions within the recordable medium for producing a list of conflicts are modified with a modification, the instructions within the recordable medium for generating GUI are unaffected by the modification to the instructions within the recordable medium for producing a list of conflicts.

26. The computer program product of claim 24, wherein the instructions within the recordable medium for operating the peripheral device and the instructions within the recordable medium for generating the GUI are independently modifiable.

27. The computer program product of claim 24, wherein when the instructions within the recordable medium for operating the peripheral device are modified with a modification, the instructions within the recordable medium for generating the GUI are unaffected by the modification to the instructions within the recordable medium for operating the peripheral device.

28. The computer program product of claim 24, wherein when the instructions within the recordable medium for generating the GUI are modified with a modification, the instructions within the recordable medium for operating the peripheral device are unaffected by the modification to the instructions within the recordable medium for generating the GUI.

29. The computer program product of claim 24, wherein the peripheral device is a printer.

30. The computer program product of claim 24, wherein the peripheral device is a copy machine, scanner, or fax machine.

31. The computer program product of claim 24, wherein the instructions within the recordable medium for generating the GUI the instructions within a recordable medium for operating a peripheral device and the instructions within the recordable medium for producing a list of conflicts are independently modifiable, such that one of the sets of instructions may be modified without affecting either of the other two sets of instructions.

32. A method for modifying a system for managing data in an operating system of a computer having a host processor, a printer properties main dialog module containing a graphic-user interface (GUI) code for generating a GUI for displaying data for a printer in operative communication with the host processor, a printer data module coupled to the printer properties main dialog module, the printer data module containing an operating code for operating the printer and causing the printer to execute a predetermined action corresponding to a computer command initiated at the GUI, and a conflict dialog module coupled to the printer data module and having a list of conflicts, each conflict corresponding to a condition of the printer and a selected predetermined action to be executed by the printer, the printer data module causing the conflict dialog module to generate a conflict from the list of conflicts, wherein the printer properties main dialog module, the printer data module and the conflict dialog module are independently modifiable, comprising the step of:

modifying one of the printer properties main dialog module, the printer data module or the conflict dialog module such that at least one of the other modules is not affected by the modification.

33. The method of claim 32, wherein the modifying step further includes modifying a selected one of the printer properties main dialog module, the printer data module or the conflict dialog module while affecting neither of the other modules.

34. The method of claim 32, wherein the modifying step includes modifying the list of conflicts of the conflict dialog module without affecting the GUI code of the printer properties main dialog module.

35. The method of claim 32, wherein the step of modifying one of the printer properties main dialog module, the printer data module or the conflict dialog module comprises modifying the GUI code of the printer properties main dialog module without affecting the list of conflicts conflict dialog module.

36. The method of claim 32, wherein the modifying step includes modifying the operating code of the printer data module without affecting the GUI code of the printer properties main dialog module.

* * * * *